United States Patent
Behler et al.

(10) Patent No.: US 12,440,413 B2
(45) Date of Patent: Oct. 14, 2025

(54) SUPPLY SYSTEM AND PROCESS FOR SUPPLYING A MEDICAL DEVICE WITH A FLUID, COMPRISING A WIRELESS ACTUATING UNIT

(71) Applicant: Drägerwerk AG & Co. KGaA, Lübeck (DE)

(72) Inventors: Maximilian Behler, Lübeck (DE); Falko Sievers, Lübeck (DE); Peter Kahns, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 804 days.

(21) Appl. No.: 17/626,605

(22) PCT Filed: Jul. 9, 2020

(86) PCT No.: PCT/EP2020/069383
§ 371 (c)(1),
(2) Date: Jan. 12, 2022

(87) PCT Pub. No.: WO2021/013564
PCT Pub. Date: Jan. 28, 2021

(65) Prior Publication Data
US 2022/0257446 A1    Aug. 18, 2022

(30) Foreign Application Priority Data
Jul. 19, 2019   (DE) .................... 10 2019 005 014.2

(51) Int. Cl.
*A61G 12/00* (2006.01)
*A61L 2/18* (2006.01)
(Continued)

(52) U.S. Cl.
CPC .............. *A61G 12/002* (2013.01); *A61L 2/18* (2013.01); *G05B 19/4155* (2013.01); *A61L 2202/24* (2013.01); *G05B 2219/49056* (2013.01)

(58) Field of Classification Search
CPC .......... A61G 12/002; A61L 2/18; A61L 2/26; G05B 19/4155; A61B 6/56; H04L 63/123; H04W 12/50; A61M 16/0003
See application file for complete search history.

(56) References Cited

U.S. PATENT DOCUMENTS 6,158,430 A    12/2000    Pfeiffer et al.
2008/0129486 A1*   6/2008    Jeckelmann ...... A61M 5/14248
                                                                340/539.12
(Continued)

FOREIGN PATENT DOCUMENTS

CN    101193671 A    6/2008
CN    107079049 A    8/2017
(Continued)

*Primary Examiner* — Bhisma Mehta
*Assistant Examiner* — Haden Matthew Ritchie
(74) *Attorney, Agent, or Firm* — McGlew and Tuttle, P.C.

(57) ABSTRACT

A supply system (1) and process supply a medical device with a fluid. A fluid supply port (3, 4, 5) of a supply unit (2) provides a fluid. An actuating unit (6a, 6b) detects an actuation of an actuating element (7a, 7b) and generates a message containing actuation information, which identifies the actuation. The message is transmitted via a wireless data connection (Dv) from a transmitter (8) of the actuating unit (6a, 6b) to a receiver (9) of the supply unit (2). The supply unit (2) changes a parameter of the fluid supply port (3, 4, 5), which influences the provision of fluid, in response to the reception of this message.

10 Claims, 2 Drawing Sheets

(51) Int. Cl.
 *G05B 19/41* (2006.01)
 *G05B 19/4155* (2006.01)

(56) References Cited

U.S. PATENT DOCUMENTS

| | | | |
|---|---|---|---|
| 2009/0121592 | A1 | 5/2009 | De Nando et al. |
| 2010/0091612 | A1 | 4/2010 | Skrobanek et al. |
| 2014/0281547 | A1* | 9/2014 | Modzelewski ......... H04L 63/18 |
| | | | 713/171 |
| 2018/0182487 | A1* | 6/2018 | Kullik ................... H04L 9/3226 |
| 2018/0361090 | A1* | 12/2018 | McDonald ........ A61M 16/1005 |
| 2021/0187192 | A1* | 6/2021 | Fuchs ................. A61M 5/1413 |

FOREIGN PATENT DOCUMENTS

| | | |
|---|---|---|
| DE | 202009012808 U1 | 3/2010 |
| DE | 102014018727 A1 | 6/2016 |
| DE | 102016203317 A1 | 9/2017 |
| DE | 102016203327 A1 | 9/2017 |
| DE | 202017004216 U1 | 3/2018 |
| DE | 102016015368 A1 | 6/2018 |
| DE | 102017005011 B3 | 9/2018 |
| DE | 102017220532 A1 | 5/2019 |
| WO | 2006114297 A1 | 11/2006 |

\* cited by examiner

SUPPLY SYSTEM AND PROCESS FOR SUPPLYING A MEDICAL DEVICE WITH A FLUID, COMPRISING A WIRELESS ACTUATING UNIT

CROSS REFERENCE TO RELATED APPLICATIONS

This application is a United States National Phase Application of International Application PCT/EP2020/069383, filed Jul. 9, 2020, and claims the benefit of priority under 35 U.S.C. § 119 of German Application 10 2019 005 014.2, filed Jul. 19, 2019, the entire contents of which are incorporated herein by reference.

TECHNICAL FIELD

The present invention pertains to a supply system and to a process, which are capable of supplying a medical device with at least one fluid. The medical device is, for example, a ventilator or an anesthesia apparatus or a patient monitor. The fluid is, for example, breathing air or pure oxygen or nitrous oxide ($N_2O$) or water or a cleaning liquid or a disinfecting liquid.

TECHNICAL BACKGROUND

Various such supply systems have become known.

A monitoring device, which monitors a unit for generating medical compressed air, is described in DE 10 2017 005 011 B3. Compressed air is suctioned off via a measuring line 3. A sensor 2 measures a property of the suctioned-off compressed air. An air humidifier 8 humidifies the compressed air.

A supply system, in which a source 1 supplies at least two consumers 2 via a supply network 3 with at least one fluid or with electrical energy, is described in DE 10 2014 018 727 A1. A plug-in connector 5, through which a fluid flows to a consumer 2, can be established by means of a plug 7 and a coupling 6. A mechanical coding 8 ensures that the correct plugs 7 and couplings 6 are connected to one another.

It is desired for a user to be able to change the feed of the fluid to the medical device.

Various actuating units for medical devices have become known.

DE 10 2017 220 532 A1 describes an image recording device 2 configured as an X-ray apparatus with a plurality of movable components 3 as well as with a control device 4. A smart device 5 configured as a smartphone is capable of detecting inputs of a user. A wireless interface of the control device 6 of the smartphone 5 is capable of transmitting messages to the control device 4 in a wireless manner via a wireless communication connection. A user selects a component 3 of the X-ray apparatus 2 by means of the smartphone 5 and prompts a final control element to move this selected component 3.

DE 20 2009 012 808 U1 describes a pulse sensor 10, which measures the pulse of a patient and comprises a main body 11, a battery 15 and a charging terminal 16. The pulse sensor 10 has, for example, the shape of a ring 10*a*, which can be put on a finger of the patient, or of a sensor 10*b*, which can be attached to the chest of the patient.

SUMMARY

A basic object of the present invention is to provide a supply system and a process for supplying a medical device with at least one fluid, in which supply system and process the provision of the fluid can be changed more easily than in prior-art supply systems.

The object is accomplished by a supply system having the features of the supply system of the invention and by a process having the process features of the invention. Advantageous embodiments are described. Advantageous embodiments of the supply system according to the present invention are also advantageous embodiments of the process according to the present invention and vice versa.

The supply system according to the present invention and the process according to the present invention are configured to supply a medical device with at least one fluid. The medical device is, for example, a ventilator or an anesthesia apparatus or a patient monitor or even a breathing mask. The fluid provided or each fluid provided may be gaseous or liquid. A gaseous fluid may be under a vacuum or under an overpressure relative to the ambient pressure. The gaseous fluid or a gaseous fluid is, for example, breathing air, oxygen, nitrous oxide ($N_2O$) or even an anesthetic. The liquid may be or comprise water or another cleaning liquid.

The supply system comprises a supply unit and an actuating unit.

The supply unit comprises at least one fluid supply port and preferably a plurality of fluid supply ports. The fluid supply port or each fluid supply port is configured to provide a fluid for a medical device.

The actuating unit comprises at least one actuating element as well as a transmitter. The actuating element of the actuating unit or each actuating element of the actuating unit may be actuated by a person. The supply system optionally comprises a plurality of actuating units with at least one respective actuating element and with a transmitter.

The supply unit comprises a receiver. A wireless data connection can be established at least from time to time between the respective transmitter of an actuating unit and the receiver of the supply unit, especially by means of electronic waves. When a data connection is established between the transmitter of the actuating unit or of an actuating unit and the receiver of the supply unit, this transmitter is capable of transmitting a message to the receiver in a wireless manner.

The actuating unit or each actuating unit is capable of detecting an actuation of the actuating element of this actuating unit or of an actuating element, Furthermore, the actuating unit is capable of generating a message, wherein this message comprises actuation information and wherein this actuation information identifies the detected actuation of the actuating element. When a data connection to the receiver of the supply unit is established, the transmitter of the actuating unit is capable of transmitting a message with the generated actuation information via this data connection to the receiver of the supply unit. An identification of the detected actuation is transmitted hereby to the supply unit in a wireless manner.

The supply unit is capable of changing a parameter of the fluid supply port or of at least one fluid supply port and preferably of each fluid supply port, i.e., it is capable of changing the value of this parameter. The change in a parameter of the fluid supply port or of a fluid supply port will hereinafter be called "an actuation of the fluid supply port." This change of the parameter, i.e., the actuation, is carried out by the supply unit automatically in response to a received message with actuation information and depending on the actuation information received.

The changed parameter influences the provision of fluid and is especially a flow rate, i.e., an indicator of the quantity per unit of time, the pressure, preferably a pressure relative to the ambient pressure, a temperature or a chemical composition of the fluid being provided. The change in the parameter may also be an increment, i.e., a change in the flow rate, in the pressure or in the temperature.

The parameter or a parameter may also be the start and/or the duration of a time period, during which this fluid shall be provided, wherein the provision shall be automatically ended after expiration of this time period. The change in the parameter may also be constituted by the provision of the fluid being started (flow rate greater than zero) or is ended (flow rate equaling zero).

The actuating unit according to the present invention makes it possible to actuate the supply unit. Thanks to the present invention, it is not necessary to actuate the medical device directly in order to change the feed of fluid to the medical device. The medical device can therefore be actuated from a remote location. This effect of the present invention does, in addition, reduce in many cases the variance among actuating units because there often are substantially fewer different supply units than medical devices to be supplied. The same supply unit is in many cases capable of supplying different medical devices one after another.

An actuating unit, which may be separated in space from the medical device, is provided according to the present invention. As a result, an actuating unit at a medical device or an actuation area at the medical device can be made smaller and more clearly visible than when additional actuating elements must be arranged on this actuating unit or on the actuation area in order to change the supply with fluid.

A message with actuation information can be transmitted according to the present invention via a data connection in a wireless manner from the transmitter of the actuating unit or of an actuating unit to the receiver of the supply unit. This feature eliminates the need to connect the actuating unit to the supply unit by a cable or another data line. The length of this data line limits the maximum possible distance between the actuating unit and the supply unit during an actuation of an actuating element of the actuating unit. It is easier in many cases to bridge over the distance between the actuating unit or an actuating unit and the supply unit by means of a wireless data connection between the transmitter and the receiver than with a data line.

The supply unit typically comprises a housing. This housing must be cleaned and disinfected regularly precisely in case the supply system is used in a hospital or in another medical setting. If the operating unit were connected to the supply unit by a cable or another data line, this data line would have to be led through an opening in the housing. This opening could be the point of entry for harmful particles. The data line would likewise have to be cleaned and disinfected regularly. This imposes additional requirements on the material from which the jacketing of the data line is manufactured. In particular, a longer data line may require a roll-up mechanism or else it may be caught at another object. In addition, a data line may be damaged under the effect of a mechanical stress.

The present invention avoids the drawbacks of such a data line because actuation information can be transmitted according to the present invention through a wireless data connection. In particular, a supply system according to the present invention can be cleaned and disinfected more easily and in a shorter time.

It is possible that an actuation of an actuating element of the actuating unit or of an actuating unit triggers the steps of a wireless data connection becoming established between the transmitter of this actuating unit and the receiver of the supply unit and of the message containing the actuation information then being transmitted via this established wireless data connection. The data connection cannot be either interrupted or ended thereafter. It is also possible that the data connection is established permanently during the use of the medical device.

In one embodiment, the supply unit comprises a plurality of fluid supply ports. These may differ from one another by different provided fluids. It is also possible that two fluid supply ports provide the same fluid with different parameters, for example, with different flow rates and/or with different pressures relative to the ambient pressure and/or with different temperatures. The supply unit optionally comprises at least one additional supply port for electrical energy or for connecting the medical device to a data network.

According to the present invention, the transmitter of an actuating unit is capable of transmitting a message with actuation information to the receiver of the supply unit. In a preferred embodiment, this actuation information comprises an identification of the fluid supply terminal, to which the actuation pertains. In case of a plurality of fluid supply ports and also in case of only one fluid supply port, the actuation information additionally preferably comprises a message with a desired action at that fluid supply port, especially the specification of whether the volume flow shall be increased or reduced. A special case is the actuation information that the provision of fluid through this fluid supply port shall be started, i.e., that it shall be increased from zero to a value greater than zero, or that it shall be ended, i.e., the volume flow shall be reduced to zero. Another special case is the actuation information that the provision of fluid shall be increased to the highest possible value. It is also possible that a user actuates an actuating element for so long and/or so often that a parameter of the fluid supply port or of a fluid supply port assumes a desired value. The value reached currently is preferably outputted in a form perceptible by a person.

A medical device can preferably be connected detachably to the fluid supply port or to at least one fluid supply port of the supply unit. As a result, various medical devices, also different medical devices, may be connected one after another to the same supply unit and be supplied with fluid.

The supply unit is preferably configured as a stationary device. It may be used, in particular, in an area used for medical purposes, e.g., in a hospital room, in an operating room and/or in an intensive care unit of a hospital, in the treatment room of a physician or even in an ambulance. A movable device or a device transportable in another manner may be connected from time to time to the supply unit and it may then be supplied with the fluid or with a fluid.

In one embodiment, the supply unit comprises a port body, which is fastened to a free end of a mounting arm, especially pivotably to a swivel arm. The fluid supply port or each fluid supply port is recessed into the port body. Another free end of this mounting arm is fastened to a ceiling or to a wall of a medical area. The mounting arm is configured such that the port body of the supply unit can move relative to the ceiling or to the wall to which the mounting arm is fastened. As a result, the port body can be brought into a desired position insofar as this is allowed by the mounting arm.

In one embodiment, the supply unit comprises a first mounting unit and optionally additionally at least one second mounting unit, wherein the second mounting unit or each second mounting unit is positioned at a spaced location from the first mounting unit. The mounting unit or each mounting unit is capable of receiving a respective actuating unit each. The actuating unit or an actuating unit can preferably be brought into the mounting unit and again removed from the mounting unit or separated in another manner from the mounting unit. A user can remove the actuating unit or an actuating unit from the mounting unit or from a mounting unit, go to a desired location, for example, into the vicinity of a patient or of a display unit of the medical device, actuate from there at least one fluid supply port at least once and subsequently bring the actuating unit again into the mounting unit or into a mounting unit. It is possible but not necessary thanks to the configuration with the mounting unit for a user to carry an actuating unit permanently along with him.

It is possible that the supply system comprises just as many actuating units as the supply unit has mounting units or that it comprises more or fewer actuating units.

Different embodiments of how a mounting unit holds an actuating unit are possible. For example, the mounting unit comprises a pocket, into which the actuating unit or an actuating unit can be placed. Or else it comprises at least one projection, and the actuating unit comprises a corresponding recess, or vice versa, the actuating unit has a projection and the mounting unit has a recess. The projection comprises, for example, a hook, and the recess has a ring. It is also possible that the mounting unit holds the actuating unit by means of a snap connection, a clamping connection, a Velcro connection or a permanent magnet or electromagnet.

In one embodiment, the supply unit comprises a housing with at least two outer wall sections. The two outer wall sections may extend in two planes, which are at right angles or extend obliquely in relation to one another and both are arranged preferably vertically. At least one mounting unit each is preferably arranged at each of these two outer wall sections. Thanks to this configuration, at least one respective actuating unit can extend from at least two different directions without having to bypass the supply unit and without the supply unit having to rotate. It is possible that at least one respective fluid supply port is additionally arranged at these two outer wall sections. In a variant of this embodiment, the housing has the shape of a cuboid column with a square layout. This column provides four outer wall sections. At least one respective mounting unit is preferably arranged at at least three of these four outer wall sections and at least one mounting unit is preferably arranged at all four outer wall sections.

In one embodiment, the supply system comprises exactly one actuating unit. Each fluid supply port of the supply unit can be actuated with this actuating unit, or at least each fluid supply port that can be actuated and operated from a distance can be actuated with this actuating unit.

In another embodiment, the supply system comprises a plurality of actuating units. Each actuating unit comprises a transmitter each. A data connection can be established at least from time to time between the respective transmitter of each actuating unit and the receiver of the supply unit, and the transmitter is capable of transmitting a message containing actuation information to the receiver in a wireless manner via this data connection. As a result, the same supply unit can be actuated by different actuating units and thereby also by different persons, even simultaneously or with an overlap in time.

In one embodiment, a separate actuating unit is associated with each fluid supply port, which can be actuated from a distance, Conversely, exactly one fluid supply port each can be actuated with each actuating unit in this embodiment.

By contrast, it is made possible in another embodiment that there are fewer actuating units than fluid supply ports. Furthermore, it is made possible that the same fluid supply port can also be actuated by various, also differently positioned actuating units.

In a preferred configuration of this other embodiment, only one data connection can be established between a transmitter of an actuating unit and the receiver of the supply unit at any one time. In other words, as long as a data connection is established between the transmitter of an actuating unit and the receiver, it is not possible to establish a data connection between the transmitter of another mounting unit and the same receiver. The supply system rather blocks and prevents the establishment of this additional data connection. Thanks to this embodiment, it is ensured that the same supply unit is not actuated and changed by different actuating units simultaneously or with an overlap in time. In particular, a plurality of persons are thus prevented from simultaneously actuating the same supply unit and especially the same fluid supply port.

The supply unit preferably stores in a memory a unique identification of the actuating unit whose transmitter is currently connected by a wireless data connection to the receiver of the supply unit, or the information that no wireless data connection is currently established. The unique identification distinguishes this actuating unit from every other actuating unit of the supply system.

In a preferred variant of this embodiment, each actuating unit comprises a first pairing unit each. The supply unit comprises a second pairing unit. In the step of establishing a data connection between the transmitter of an actuating unit and the receiver of the supply unit, the two pairing units attempt to carry out a pairing. If this pairing is successful, the data connection is established. As long as this data connection is established, the process in which the first pairing unit of another actuating unit and the second pairing unit could carry out a pairing successfully and thereby establish an additional data transmission is blocked. In addition, the undesired process in which a user could actuate the supply unit with another actuating unit or with another device inadvertently or even in an unauthorized manner is prevented hereby.

According to the present invention, the supply system is capable of establishing a wireless data connection between the transmitter of the actuating unit or of an actuating unit and the receiver of the supply unit at least from time to time. A message containing actuation information can be transmitted via this data connection from the transmitter to the receiver. In one embodiment, the receiver is capable, conversely, of transmitting a message to the transmitter. In one embodiment, the receiver of the supply unit transmits a message containing actuation information to the transmitter as soon as the actuation of the fluid supply port or of a fluid supply port, which actuation is specified in the actuation information, has been performed. As an alternative, the receiver transmits an error message to the transmitter if this actuation could not be carried out. The actuating unit preferably comprises an output unit in order to output a received message in a form perceptible for a person. This embodiment reduces especially the risk of a user being in the belief of having actuated a fluid supply port, but this fluid supply port was not actuated in reality.

In one embodiment, the transmitter of an actuating unit transmits a message containing actuation information in a coded form. The receiver of the supply unit preferably transmits a computer-analyzable code for coding a message containing actuation information. This embodiment leads to a further reduction of the risk of a fluid supply port being actuated by an unauthorized person.

In a variant of this embodiment, the supply system comprises at least two supply units with a respective receiver each. Each receiver is capable of transmitting a message to the transmitter of the actuating unit or of an actuating unit in a coded form. The two supply units have different codes. The actuating unit uses a received code of a supply unit in order to transmit a message containing actuation information to this supply unit in a coded form. In one embodiment, both supply units can be actuated with the same actuating unit.

The embodiment with the different codes leads to a further reduction of the risk of a fluid supply port being actuated inadvertently or in an unauthorized manner.

An activation criterion, which is related to the position, orientation, movement and/or acceleration of an actuating unit relative to the supply unit and/or to the distance between the actuating unit and the supply unit, is specified in one embodiment. A data connection between the transmitter of the actuating unit or of an actuating unit and the receiver of the supply unit can be established now when this activation criterion is met. It is otherwise impossible to establish the data connection.

According to a preferred configuration of this embodiment, the supply system comprises a position sensor, which measures the position, orientation, movement and/or acceleration of an actuating unit relative to the supply unit. This position sensor may be a part of the actuating unit or a part of the supply unit. A control device of the actuating unit and/or a control device of the supply unit receives signals of the position sensor and checks depending on these signals whether the predefined activation criterion is met or not. This configuration leads to a further reduction of the risk of an undesired or unauthorized actuation of a fluid supply port being triggered.

If the activation criterion is met, a wireless data connection can be established. The position sensor preferably also measures the relative position, orientation, movement and/or acceleration at least once also when a data connection has been established, and the control device checks depending on signals of the position sensor whether the activation criterion is still met. The control device preferably interrupts the established data connection when the activation criterion is not met any longer. This configuration leads to a further reduction of the risk of an undesired or inadvertent or unauthorized actuation.

One embodiment of the present invention makes it possible in many cases to ensure that a fluid supply port is actuated only when the distance between the actuating unit and the supply unit is not greater than a predefined maximum distance and/or when the actuating unit and the supply unit are located in the same room. This embodiment reduces the risk of a user actuating a fluid supply port inadvertently or in an unintended manner, which may also happen if this user is verified as an authorized person.

The range of the transmitter is limited in this embodiment to a defined maximum transmitting power, preferably to a transmitting power in a range of −6 dBm to 3 dBm, and especially to about 0 dBm. The maximum transmitting power can be selected, for example, such that the electromagnetic waves emitted by the transmitter cannot pass through a wall and/or the distance that the emitted electromagnetic waves can bridge over is at most equal to the maximum distance.

A wireless data connection can be established according to the present invention at least from time to time between the transmitter of an actuating unit and the receiver of the supply unit. In one embodiment, this data connection is established according to at least one of the following transmission processes:

Bluetooth, especially Bluetooth Advertising,
WLAN
Certified Wireless USB
ZigBee
Z-Wave
DECT
WirelessHART
HiperLAN
HomeRF
LoRaWAN.

It is possible that a first transmission process is used at first. If the attempt at establishing a wireless data transmission via this first process fails, a second transmission process is used. It is also possible that the transmission process used depends on a measured ambient condition. The ambient condition may depend, for example, on which electronic devices, which are used for the actuation, are located in the vicinity of the actuating unit.

The actuating unit or each actuating unit preferably comprises a separate voltage supply unit. The voltage supply unit preferably comprises at least one docking station, into which an actuating unit can be inserted. After the insertion, the voltage supply unit of the inserted actuating unit is charged. This embodiment eliminates the need for having to remove the voltage supply unit from the actuating unit for charging. It is possible to charge different actuating units one after another in the same docking station.

The actuating unit or each actuating unit may preferably be used optionally in an activated mode or in a standby mode. The actuating unit is capable of detecting in the activated mode an actuation of an actuating element and to transmit a message with actuation information to the receiver. The actuating unit consumes less electrical energy per unit of time in the standby mode than in the activated mode. This embodiment prolongs the duration of use of the actuating unit compared to an embodiment in which the actuating unit is permanently in an activated mode.

The actuating unit preferably passes automatically over into the standby mode when no actuating element has been actuated in the course of a time period of a predefined minimum duration. The actuating unit preferably passes automatically over from the standby mode into the activated mode again, i.e., it is "woken up" when at least one of the following events has been detected:

The actuating element or an actuating element of the actuating unit was actuated.

A motion sensor of the actuating unit detects a movement of the actuating unit.

A proximity sensor detects that a living being and/or an object is approaching the actuating unit. The proximity sensor may measure, e.g., the temperature and recognize thereby that the hand of a user is reaching for the actuating unit.

The transmitter of the actuating unit is additionally capable of receiving messages, doing so in the standby mode as well, and an activation message was transmitted to this transmitter.

It is possible to configure the actuating unit such that it passes over into the activated state sufficiently rapidly in case of a desired actuation.

The actuating unit comprises a verification unit in one embodiment, A user can be automatically verified as an authorized user by means of this verification unit, or it can be determined that a user is not authorized. The verification unit detects, for example, an inputted or spoken sequence of alphanumeric signs and compares this to at least one stored sequence of alphanumeric signs, which is associated with an authorized user. Or else, the verification unit detects a biometric feature, for example, a fingerprint or a feature of the iris, and compares this detected biometric feature to a stored biometric feature, which is associated with an authorized user. The user in question can use the actuating unit to actuate a fluid supply port only if a user has been verified as an authorized user.

In one embodiment, a user of the actuating unit who is recognized as being authorized can actuate each fluid supply port of the supply unit. In another embodiment, the specific fluid supply ports which a user in question is allowed to actuate and which he is not allowed to actuate are specified for each registered authorized user. For example, certain users are allowed to actuate each fluid supply port, and other users are only allowed to actuate a particular fluid supply port or some fluid supply ports only. It can be ensured by this embodiment that only a sufficiently qualified and authorized user will actuate a fluid supply port. On the other hand, qualified users are relieved because certain fluid supply ports may also be actuated by other users.

According to the present invention, the actuating unit or each actuating unit comprises at least one actuating element each. The actuating element or at least one actuating element preferably comprises a physical button and/or a switch and/or a switching surface. This actuating element projects over a housing of the actuating unit or protrudes from the housing. Such an actuating element can be actuated more reliably in many cases than an actuating element configured in another manner, especially if a user is wearing gloves and/or when the user actuates the actuating element without looking at the actuating unit but is looking, for example, at a patient or at the supply unit or at a display unit, which displays vital parameters of the patient.

The actuating unit or each actuating unit comprises according to the present invention at least one respective actuating element. The actuating unit or at least one actuating unit comprises in one embodiment a plurality of actuating elements. Each actuating element can preferably be actuated independently from the other actuating element or from each other actuating element. A plurality of actuating elements of an actuating unit may be related to different fluid supply ports and/or to different parameters of the said fluid supply port.

The supply unit and the actuating unit or each actuating unit preferably comprise a housing each. Each housing is preferably configured such that the housing meets the requirements imposed on a medical device, which are relevant for a housing, especially requirements related to the cleaning and disinfection of a device.

The present invention will be described below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
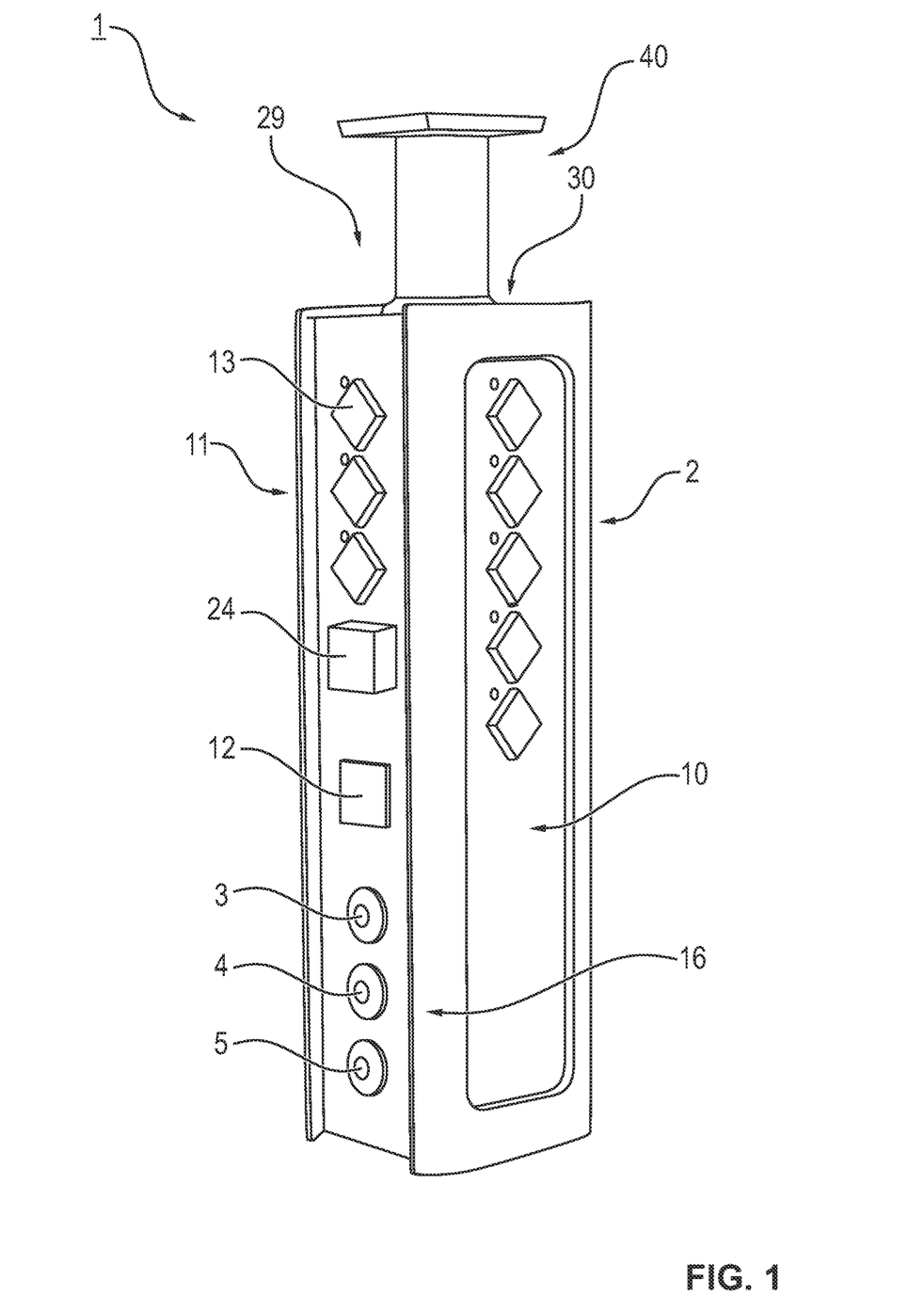
FIG. 1 is a perspective view of first embodiment of the supply system, in which the actuating units are omitted.
Figure 2:
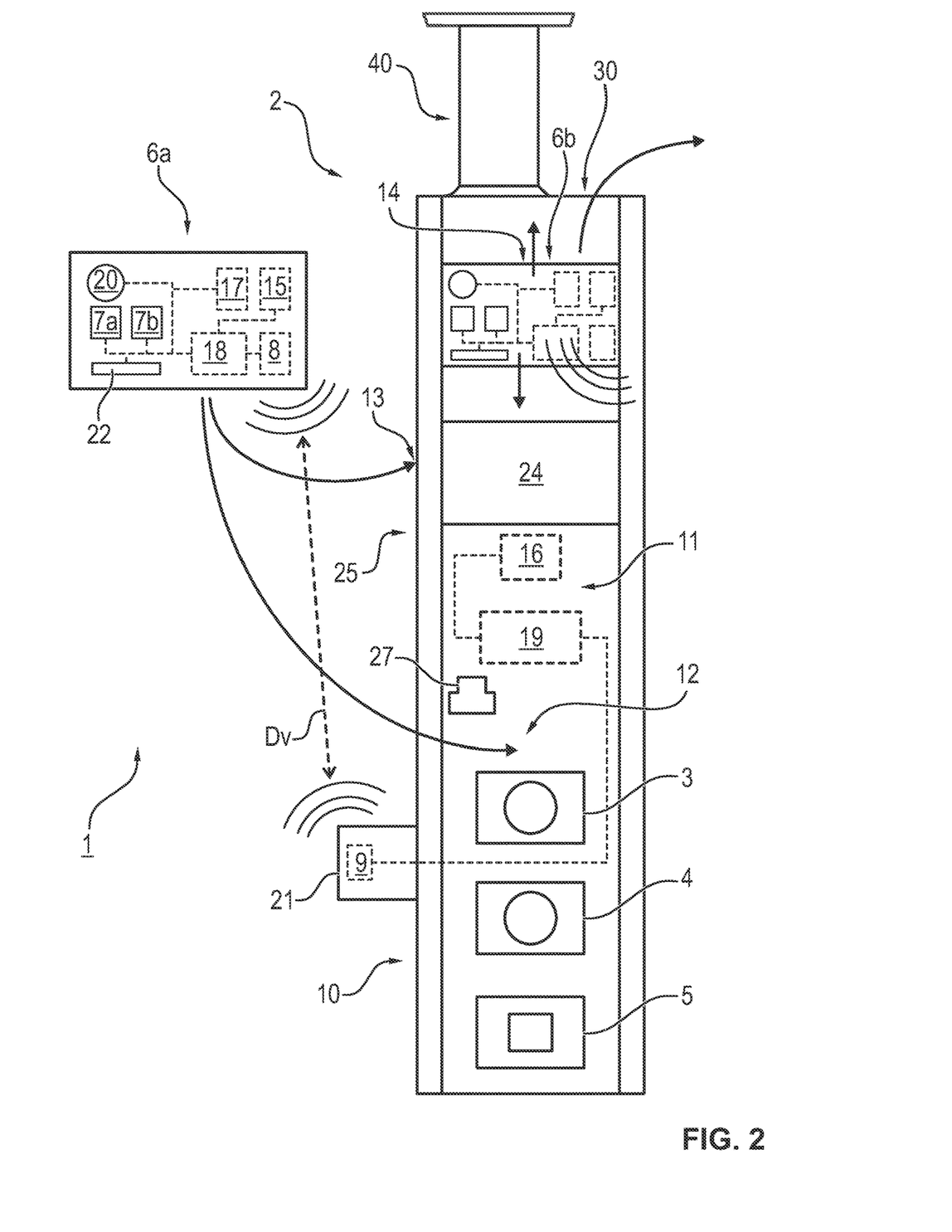
FIG. 2 is a schematic view of a second embodiment of the supply system, in which the actuating units are shown.

Referring to the drawings, FIG. 1 and FIG. 2 schematically show two slightly different embodiments of a supply system 1, which is capable of supplying a medical device, not shown, with different supply media, e.g., with different fluids, i.e., gases or liquids. The medical device is, for example, a ventilator or an anesthesia apparatus or a patient monitor. A stationary supply unit 2 is fastened, for example, to a wall or ceiling of a hospital room and comprises a port body 25 with a plurality of outer wall sections 11, 12.

This port body 25 preferably has the shape of a column with a square or otherwise rectangular layout. The port body 25 is suspended on a mounting arm 40, which is shown only partially in the figures. An upwards pointing end face 30 of the port body 25 is connected to the mounting arm 40 via a mounting area 29.

A plurality of fluid supply ports 3, 4, 5 are integrated in this port body 25. Each fluid supply port 3, 4, 5 is capable of providing a supply medium in the form of a fluid and can be detachably connected to a respective corresponding supply line of the medical device. The supply port 3 is capable of providing oxygen, the supply port 4 breathing air with a lower flow rate and the supply port 5 breathing air with a higher flow rate, i.e., a total of two different fluids, in the exemplary embodiment. Another supply port 27 is a network connection, for example, an RJ45 socket for an Ethernet connection. By an RJ45 plug being plugged into this socket, the medical device can be connected to a wired data network of the hospital. The port body 25 optionally comprises at least one electrical supply connection, not shown, in the form of a socket, in order to provide electrical energy, and optionally a grip in order to change the position of the port body 25 relative to the mounting arm 40.

Furthermore, two actuating units 6a and 6b belong to the supply system 1; they are shown in FIG. 2 only and are configured in the exemplary embodiment as portable devices in the manner of a remote control and may have a similar configuration or may differ from one another. The supply system 1 may optionally comprise at least one additional actuating unit. Each actuating unit 6a, 6b comprises a separate voltage supply unit, preferably a battery or a battery pack. Three mounting units 12, 13, 14 and optionally at least one additional mounting unit, not shown, are arranged on the port body 25. The two mounting units 12 and 14 are arranged on a front outer wall section 11 pointing towards the viewer in FIG. 1, and the mounting unit is arranged on a lateral outer wall section 10. The mounting units 12, 13, 14 may comprise a pocket each, into which the actuating unit 6a, 6b can be placed. In an alternative embodiment, the mounting unit holds an actuating unit 6a, 6b by means of a permanent magnet or electromagnet. Such a mounting unit can be disinfected and cleaned more easily than mounting units of other configurations.

Each mounting unit 12, 13, 14 is capable of receiving an actuating unit 6a, 6b each. An actuating unit 6a, 6b may optionally be inserted into a mounting unit 12, 13, 14 or inserted into and removed from this mounting unit 12, 13, 14 in another manner. Each actuating unit 6a, 6b may preferably optionally be inserted into each of the mounting units 12, 13, 14. A mounting unit 12, 13, 14 prevents an inserted actuating unit 6a, 6b from falling out by itself.

The port body 25 comprises, furthermore, a docking station 24 on the front outer wall section 11 and optionally an additional docking station, not shown. The docking station 24 has a contact surface. Each actuating unit 6a, 6b has a corresponding contact surface. If the actuating unit 6a, 6b is inserted into the docking station 24 or into another docking station, the voltage supply unit of the inserted actuating unit 6a, 6b is charged via the two contact surfaces. As an alternative, the docking station 24 is also capable of charging the voltage supply unit inductively and hence in a contactless manner (contactlessly).

The actuating unit 6a comprises two actuating elements 7a, 7b and optionally additional actuating elements, not shown, which a user can actuate in order to actuate a fluid supply port 3, 4, 5 and thereby to change the volume flow of the fluid through the fluid supply port 3, 4, 5. In particular, the user can switch on or switch off the volume flow as well as increase or decrease the volume flow by this actuation. In one embodiment, each actuating element 7a, 7b is assigned to a respective fluid supply port 3, 4, 5. In another embodiment, the user selects at first with an actuating element 7a a fluid supply port 3, 4, 5 and then changes the volume flow with another actuating element 7b. The actuating unit 6b has exactly the same configuration as the actuating unit 6a in the exemplary embodiment.

The actuating unit 6a comprises, in addition, a data-processing control device (controller) 18 and a transmitter 8. The actuating unit or every other actuating unit 6b likewise comprises a control device and a transmitter each. The control device 18 is capable of detecting an actuation of an actuating element 7a, 7b and of generating a message containing actuation information corresponding to the actuation. This actuation information comprises the setting of a fluid supply port 3, 4, 5 as well as a requested actuation of this fluid supply port 3, 4, 5. The supply unit 2 comprises a control device (controller) 19 and a receiver 9. The receiver 9 is arranged at a projection 21. A wireless data connection Dv can be established at least from time to time, especially by means of radio waves, between the transmitter 8 of an actuating unit 6a, 6b and the receiver 9 of the supply unit 2. The transmitter 8 is capable of transmitting via this data connection Dv a message containing actuation information to the receiver 9. The control device 19 of the supply unit 2 receives this message and analyzes it and actuates the specified fluid supply port 3, 4, 5 as specified in the received message.

It is ensured in the exemplary embodiment that at most one actuating unit 6a, 6b can send a message to the receiver 9 of the supply unit 2 at any one time. A plurality of actuating units 6a, 6b can, of course, transmit a message each one after another to the receiver 9. The actuating unit 6a comprises a pairing unit 15 and the supply unit 2 comprises a pairing unit 16. Before a message can be transmitted from the actuating unit 6a to the supply unit 2, the two pairing units 15 and 16 perform a pairing and they thereby establish an exclusive wireless data connection Dv between the actuating unit 6a and the supply unit 2. "Exclusive" means that no other actuating unit can transmit a message to the supply unit 2 as long as this exclusive data connection Dv is established. This data connection Dv is interrupted or ended when a predefined interruption criterion is met, for example, when no more data have been transmitted any more to this data connection Dv during a time period of a predefined minimum duration. This also applies correspondingly to the actuating unit 6b.

An actuating unit shall be prevented from inadvertently actuating a fluid supply port 3, 4, 5 of the supply unit 2, for example, because the user of this actuating unit wants in reality to actuate another fluid supply port of the same supply unit, another supply unit or another device. Furthermore, an improper actuation shall be prevented. A plurality of mechanisms are employed in the exemplary embodiment to prevent this. These mechanisms will be explained on the basis of the example of the actuating unit 6a. The actuating unit 6b and an optional third actuating unit likewise have at least some or all of these safety mechanisms.

The actuating unit 6a comprises a verification unit 22. This checks whether a user of the actuating unit 6a is an authorized user, i.e., a user who is authorized to transmit actuation commands to the supply unit 2 by means of the actuating unit 6a. The verification unit 22 detects, for example, a password or a PIN from the user or carries out an isometric checking. The actuating elements 7a, 7b are blocked until a user has been recognized as being an authorized user.

The authorization of the user may cover all supply units and all fluid supply ports of these supply units or be limited to certain supply units and/or to certain fluid supply ports 3, 4, 5 and/or to certain types of actuation. The actuating unit 6a optionally blocks an actuating element 7a, 7b if the current user is not authorized to trigger an actuation by means of that actuating element 7a, 7b.

The transmitter 8 of the actuating unit 6a is limited in the exemplary embodiment to a transmission power in a range of −6 dBm to 3 dBm (decibel milliwatts), especially to about 0 dBm. It is achieved hereby that the actuating unit 6a can actuate the supply unit 2 only if a distance not greater than a predefined maximum distance is maintained between the actuating unit 6a and the supply unit 2. In addition, it is not possible, as a rule, thanks to this configuration for a message containing actuation information to pass through a wall. The actuating unit 6a is prevented hereby from actuating a supply unit that is currently located in another room. Such an activation from one room into another room is, as a rule, undesirable.

The actuating unit 6a comprises, moreover, a position sensor 17. This position sensor is capable of measuring a position, orientation, movement and/or acceleration of the actuating unit 6a relative to the supply unit 2. The control device 18 of the actuating unit 6a receives signals from the position sensor 17 and checks whether the measured position, orientation, movement and/or acceleration of the actuating unit 6a relative to the supply unit 2 meets a predefined activation criterion, for example, whether the distance is within a predefined maximum distance limit. The control device 18 of the actuating unit 6a makes it possible for a pairing to take place between the actuating unit 6a and the supply unit 2 only if the activation criterion is met.

It is checked preferably at least once after the establishment of the data connection Dv whether the activation criterion is still met. This checking is preferably repeated regularly, especially at a fixed frequency. If the activation criterion is not met, the data connection Dv is preferably interrupted, for example, by a depairing.

In one embodiment, the transmitter 8 transmits the measured position, orientation, movement and/or acceleration of the actuating unit 6a to the receiver 9. The control device 19 of the supply unit 2 makes it possible for a pairing to be able to be carried out between the actuating unit 6a and the supply unit 2.

The actuating units 6a and 6b and additional optional actuating units comprise each a separate voltage supply unit and are connected to the stationary voltage supply network of the hospital only when the actuating unit 6a, 6b is positioned in the docking station 24. In one embodiment, the supply system 1 comprises more actuating units 6a, 6b than there are docking stations 24. In addition, an actuating unit 6a, 6b is not located, as a rule, in the docking station 24 or in a docking station 24 when it is being used for an actuation of a fluid supply port 3, 4, 5. To reduce the consumption of electrical energy, a saving mechanism is applied, which will be described below, for the actuating unit 6a. This or another saving mechanism is preferably also embodied on the actuating unit 6a and on the additional actuating unit or on every other actuating unit.

The actuating unit 6a is optionally in an activated mode, in which it is capable of detecting an actuation of the actuating element 7a, 7b and is capable of emitting a message containing actuation information, or in a standby mode, in which the energy consumption is reduced compared to the activated mode. The actuating unit 6a passes by itself over from the activated mode into the standby mode if it has not been used during a time period that has a predefined minimum duration and especially if no actuation of an actuating element 7a, 7b has been performed. The actuating unit 6a jumps automatically into the activated mode again when at least one of the following events has occurred and has been detected:

A user is actuating an actuating element 7a, 7b,

The position sensor 17 detects a movement or an acceleration above a predefined lower threshold, and A proximity sensor 20 of the actuating unit 6a detects that a person is approaching the actuating unit 6a or has grasped same.

While specific embodiments of the invention have been shown and described in detail to illustrate the application of the principles of the invention, it will be understood that the invention may be embodied otherwise without departing from such principles.

LIST OF REFERENCE CHARACTERS

1 Supply system; comprises the supply unit 2, the actuating units 6a, 6b and optionally additional actuating units
2 Supply unit; comprises the port body 25, the mounting arm 40, the receiver 9, the pairing unit 16 and the control device 19
3 Fluid supply port for oxygen at the port body 25
4 Fluid supply port for breathing air with a lower flow rate at the port body 25
5 Fluid supply port for breathing air with a higher flow rate at the port body 25
6a Actuating unit of the supply system 1; comprises the actuating elements 7a, 7b, the transmitter 8, the pairing unit 15, the position sensor 17 and the control device 18
6b Additional actuating unit of the supply system 1
7a, 7b Actuating elements of the actuating unit 6a
8 Transmitter of the actuating unit 6a; is in a wireless data connection Dv with the receiver 9 from time to time of the actuating unit 6a
9 Receiver of the supply unit 2; is in a wireless data connection Dv with the transmitter 8 from time to time
10 Lateral outer wall section with the mounting unit 13
11 Front outer wall section with the mounting units 12, 14
12, 14 Mounting units at the front outer wall section 11
13 Mounting unit at the lateral outer wall section 10
15 Pairing unit of the actuating unit 6
16 Pairing unit of the supply unit 2
17 Position sensor of the actuating unit 6a; measures the position, orientation, movement and/or acceleration of the actuating unit 6a relative to the supply unit 2
18 Data-processing control device of the actuating unit 6a
19 Data-processing control device of the supply unit 2
21 Projection of the supply unit 2, at which the receiver 9 is arranged
22 Verification unit of the actuating unit 6a; checks whether a user is authorized
24 Docking station at the front outer wall section 11
25 Port body; comprises the fluid supply ports 3, 4, 5, the supply port 27, the docking station 24, the mounting units 12, 13, 14, the projection 21 and the upwards pointing end face 30
27 Network connection in the form of an RJ45 socket at the port body 25
29 Mounting area, which connects the end face 30 of the port body 25 to the mounting arm 40
40 Mounting arm, on which the port body 25 is suspended; fastened or can be fastened to a ceiling
Dv Wireless data connection between the transmitter 8 and the receiver 9

The invention claimed is:

1. A supply system for supplying a medical device with at least one fluid, the supply system comprising:
a supply unit, wherein the supply unit comprises at least one fluid supply port and a receiver, wherein the at least one fluid supply port is configured to provide a fluid for a medical device; and
an actuating unit, wherein the actuating unit comprises at least one actuating element, which is configured to be actuated by a person, and a transmitter,
wherein the supply system is configured to establish a wireless data connection from the transmitter to the receiver and the wireless data connection is established for a transmission of messages from the transmitter to the receiver,
wherein the actuating unit is configured:
to detect an actuation of the at least one actuating element;
as a portable device, which is configured as a remote control; and
depending on the detected actuation, to generate a message with actuation information identifying the actuation and to transmit the generated message via the wireless data connection to the receiver,
wherein the supply unit is configured to change a parameter of the at least one fluid supply port of the supply unit in response to the receipt of the generated message with the actuation information, wherein the supply unit comprises a first mounting unit, which is configured to receive the actuating unit and to hold the actuating unit detachably, wherein the actuating unit is configured be inserted into the first mounting unit and to be removed again from the first mounting unit, and
wherein the parameter influences a provision of fluid through the at least one fluid supply port.

2. A supply system in accordance with claim 1,
wherein the supply system comprises at least one second mounting unit,
wherein the at least one second mounting unit is located at a spaced location from the first mounting unit and is configured to receive and to hold the actuating unit detachably, and wherein the actuating unit is configured to be selectively inserted into the first mounting unit or into the at least one second mounting unit and can be removed again there from.

3. A supply system in accordance with claim 1, further comprising at least another actuating unit to provide at least two actuating units,
wherein the other actuating unit comprises another unit transmitter,
wherein the supply system is configured to establish another wireless data connection from the other unit transmitter to the receiver and the other wireless data connection is established for a transmission of messages from the other unit transmitter to the receiver,
wherein the supply system is configured such that when the wireless data connection is established for the transmission of the message from the transmitter of the actuating unit to the receiver, the establishment of the other wireless data connection for the transmission of messages from the other unit transmitter of the other actuating unit to the receiver is blocked.

4. A supply system in accordance with claim 3,
wherein each actuating unit comprises a respective first pairing unit,
wherein the supply unit comprises a second pairing unit, and
wherein the two pairing units are configured to carry out a pairing between a respective one of the actuating units and the supply unit.

5. A supply system in accordance with claim 1,
wherein after the establishment of the wireless data connection between the transmitter and the receiver, the message is transmittable from the receiver to the transmitter,
wherein the supply unit has a memory, in which a computer-analyzable code is stored,
wherein the receiver is configured to transmit the message with the code to the transmitter, and
wherein the transmitter is configured to code the message containing actuation information with use of the received code and to transmit the coded message via the wireless data connection to the receiver.

6. A supply system in accordance with claim 1, further comprising a position sensor, which is configured to detect a position, orientation, movement and/or acceleration of the actuating unit relative to the supply unit and/or a distance between the actuating unit and the supply unit, and wherein the supply system is configured to selectively make possible or to prevent establishment of the wireless data connection between the transmitter of the actuating unit and the receiver depending on a signal of the position sensor.

7. An arrangement comprising:
a medical device; and
a supply system, the supply system comprising:
a supply unit, the supply unit comprising at least one fluid supply port and a receiver, wherein the at least one fluid supply port is configured to provide a fluid for the medical device; and
an actuating unit, the actuating unit comprising at least one actuating element, configured as a portable device, which is configured as a remote control to be actuated by a person and a transmitter, wherein the supply system is configured to establish a wireless data connection from the transmitter to the receiver, the actuating unit being configured to detect an actuation of the at least one actuating element and depending on the detected actuation, to generate a message with actuation information identifying the actuation and to transmit the generated message via the wireless data connection to the receiver, wherein:
the wireless data connection is establishable for a transmission of messages from the transmitter to the receiver and the supply unit is configured to change a parameter of the at least one fluid supply port of the supply unit in response to the receipt of one of the messages with the actuation information, and the parameter influences a provision of fluid through the at least one fluid supply port,
wherein the medical device is connected to the at least one fluid supply port,
wherein the supply unit comprises a first mounting unit, which is configured to receive the actuating unit and to hold the actuating unit detachably, and
wherein the actuating unit is configured to be inserted into the first mounting unit and to be removed again from the first mounting unit.

8. A supply system process comprising the steps of:
providing the supply system, wherein supply system comprises:
a supply unit, the supply unit comprising at least one fluid supply port and a receiver, wherein the at least one fluid supply port is configured to provide a fluid for a medical device; and
an actuating unit, the actuating unit comprising at least one actuating element, configured as a portable device, which is configured as a remote control to be actuated by a person, and a transmitter, wherein the supply system is configured to establish a wireless data connection from the transmitter to the receiver, the actuating unit being configured to detect an actuation of the at least one actuating element and depending on the detected actuation, to generate a message with actuation information identifying the actuation and to transmit the generated message via the wireless data connection to the receiver, wherein:
the wireless data connection is establishable for a transmission of messages from the transmitter to the receiver and the supply unit is configured to change a parameter of the at least one fluid supply port of the supply unit in response to the receipt of one of the messages with the actuation information, and the parameter influences a provision of fluid through the at least one fluid supply port, wherein the medical device is connectable to the at least one fluid supply port of the supply system, wherein the supply unit comprises a first mounting unit, which is configured to receive the actuating unit and to hold the actuating unit detachably,
wherein the actuating unit is configured to be inserted into the first mounting unit and to be removed again from the first mounting unit; and
supplying the medical device with at least one fluid from the at least one fluid supply port.

9. A supply system process according to claim 8, further comprising the steps of:
detecting, with the actuating unit, an actuation of the at least one actuating element,
generating, with the actuating unit, the message containing actuation information identifying the actuation depending on the detected actuation,
establishing the wireless data connection for the transmission of the message from the transmitter to the receiver, transmitting the generated message, via the established wireless data connection, from the transmitter to the receiver, and changing a parameter of the supply unit is changed in response to the reception of the actuation information, wherein this parameter influences the provision of fluid through the at least one fluid supply port or through at least one fluid supply port.

10. A supply system process in accordance with claim 9, wherein the wireless data connection for the transmission of the message from the transmitter to the receiver is established only when a predefined connection criterion is met, wherein the predefined connection criterion is met at least if
- a position, orientation, movement and/or acceleration of the actuating unit relative to the supply unit, which is measured relative to the supply unit, meets a predefined activation criterion and/or
- a distance between the actuating unit and the is shorter than or equal to a predefined maximum distance and/or
- a verification unit verifies that the detected actuation of the at least one actuating element was carried out by an authorized user, and/or
- no wireless data connection is currently established from the transmitter of another actuating unit to the receiver.

* * * * *